United States Patent
Tojo et al.

(10) Patent No.: US 7,848,352 B2
(45) Date of Patent: Dec. 7, 2010

(54) COMMUNICATION RELAY DEVICE, COMMUNICATION RELAY METHOD AND COMPUTER PROGRAM PRODUCT FOR COMMUNICATION RELAY

(75) Inventors: Takayuki Tojo, Saitama (JP); Takaaki Horibuchi, Saitama (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 1005 days.

(21) Appl. No.: 11/366,530

(22) Filed: Mar. 3, 2006

(65) Prior Publication Data

US 2006/0209856 A1    Sep. 21, 2006

(30) Foreign Application Priority Data

Mar. 17, 2005    (JP) .............................. 2005-077185

(51) Int. Cl.
  *H04J 3/16*    (2006.01)
(52) U.S. Cl. .................................................... 370/468
(58) Field of Classification Search ............... 370/466, 370/468
  See application file for complete search history.

(56) References Cited

U.S. PATENT DOCUMENTS

| | | | | |
|---|---|---|---|---|
| 6,252,950 | B1 * | 6/2001 | Duty et al. ................... | 379/111 |
| 7,245,607 | B1 | 7/2007 | Shaffer et al. | |
| 2002/0181504 | A1 * | 12/2002 | Abel et al. ................... | 370/468 |
| 2005/0063391 | A1 * | 3/2005 | Pedersen ............... | 370/395.21 |
| 2005/0135243 | A1 * | 6/2005 | Lee et al. .................... | 370/229 |

FOREIGN PATENT DOCUMENTS

| | | |
|---|---|---|
| JP | 2000-165516 A | 6/2000 |
| JP | 2004-108124 | 7/2004 |
| JP | 2004-208124 A | 7/2004 |
| WO | WO-2004/015520 A2 | 2/2004 |

OTHER PUBLICATIONS

Office Action from Chinese Patent Office dated Jan. 9, 2009.
Hiroyuki Kamita et.al., "Univerge QX Series Switches", IT/Network Integration Solution, NEC technical report, vol. 57, No. 5, NEC Corporation, Nov. 10, 2004, pp. 99-102.
Yoichi Nasuno et. al., "IP network improved by router", Nikkei Network, No. 57, Nikkei BP, Dec. 22, 2004, pp. 184-189.

* cited by examiner

*Primary Examiner*—Chirag G Shah
*Assistant Examiner*—Amarnauth Persaud
(74) *Attorney, Agent, or Firm*—Rabin & Berdo, P.C.

(57) ABSTRACT

There is provided a relay device which enables improved communication quality and cost-reduction, wherein the device carries out both real-time communications and non-real-time communications. A first communicator carries out packet communications with a first real-time communication device and a first non-real-time communication device, which are connected through an external network. A second communicator accommodates a second real-time communication device included in an internal network. A third communicator accommodates a second non-real-time communication device included in the internal network. A connection controller controls a connection of the first and second real-time communication devices. A timing checker detects a timing before the connection between the first and second real-time communication devices, and a timing after the disconnection between them by monitoring operations of the connection controller. A resource controller controls resources for real-time communications and those for non-real-time communications based on the timings detected by the timing checker.

33 Claims, 6 Drawing Sheets

FIG. 1

PRIOR ART

COMMUNICATION RELAY DEVICE, COMMUNICATION RELAY METHOD AND COMPUTER PROGRAM PRODUCT FOR COMMUNICATION RELAY

BACKGROUND OF THE INVENTION

1. Field of the Invention

The present invention relates to a relay device, a relay method and a relay program, which are used in a communication network, wherein the network carries out both real-time communications and non-real-time communications. The present invention may be used for a broadband router compatible with, for example, both Internet-connection services, and Internet-protocol (IP) telephone services.

2. Description of Related Art

For example, the Internet and a local area network (LAN) have been known as a communication network which carries out both real-time communications and non-real-time communications. In the above communication networks, both the real-time communications and the non-real-time communications are carried out using a same transmission band.

The real-time communication is the communication in which allowable delay time is defined. For example, an IP telephone system, a video telephone system, a facsimile system, and a television conference system have been known as the real-time communications.

The non-real-time communication is the communication in which there is no limit in the delay time. Data communications such as the World Wide Web (WWW), and File-Transfer-Protocol (FTP) Transfer have been known as the non-real-time communications.

Figure 1:
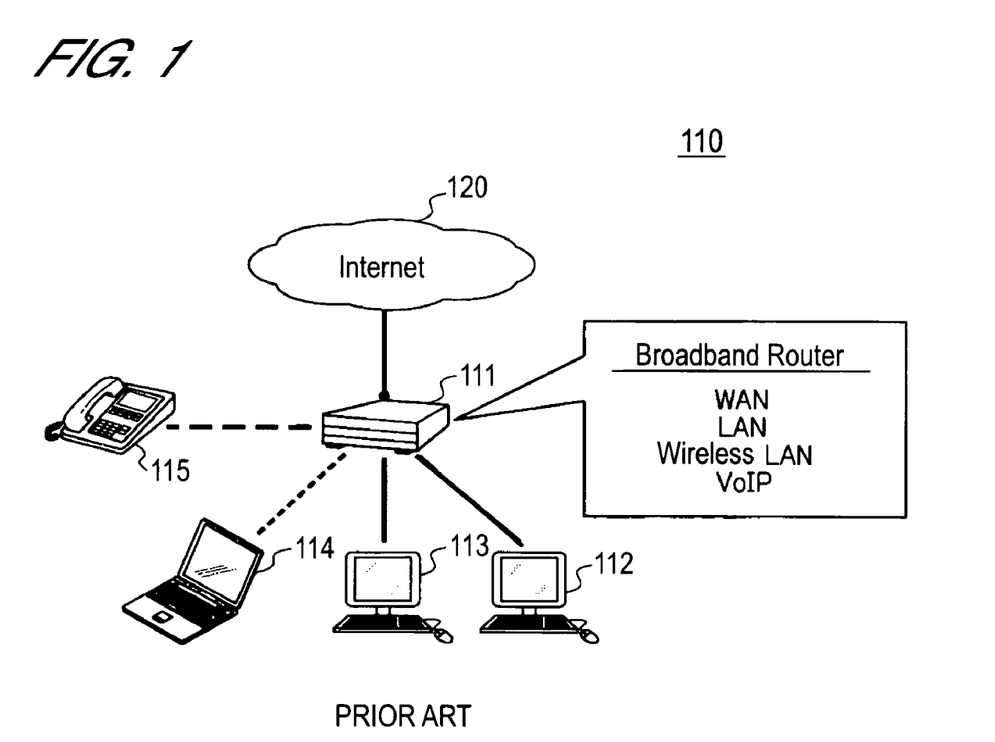
FIG. 1 is a conceptual view showing one example of the structure of a communication network which carries out both real-time communications and non-real-time communications.

For example, a broadband router has been known as a relay device used in a communication network compatible with real-time communications and non-real-time communications. FIG. 1 shows a conceptual view showing one example of a communication network using a broadband router. A communication network 110 in FIG. 1 includes a broadband router 111, LAN terminals 112 through 114, and an IP telephone 115. The broadband router 111 has communication functions for a wide area network (WAN), a LAN, a wireless LAN, and a Voice over IP (Vol P) technology. The broadband router 111 is connected to the Internet 120 through a WAN. Furthermore, the broadband router 111 accommodates terminals 112 and 113 through LAN cables, a terminal 114 using wireless communications, and a telephone 115 through analog cables. In the example of FIG. 1, the terminals 112 through 114 carry out non-real-time communications, and, moreover, the IP telephone 115 carries out real-time communications.

When real-time communications and non-real-time communications are carried out using a same transmission band, a technique is necessary for preventing delay time in the real-time communications from exceeding an allowed value. The reason is that, when the delay time in the real-time communications exceeds the allowed value, there is a possibility that overflow of communication data is generated in a buffer of a relay device. The overflow of communication data causes delay in data transfer and loss of data. Accordingly, communication quality is deteriorated.

A communication device which can inhibit overflow in real-time communications has been disclosed in Japanese Patent Application Laid-Open No. 2004-208124. The communication device according to the above-described patent document is provided with a function by which a data amount in real-time communications is monitored. The communication device extends a transmission bandwidth allocated for real-time communications when the data amount in the real-time communications exceeds a predetermined threshold.

However, when the data amount in the real-time communications is rapidly changed, it is difficult to prevent overflow of communication data because the communication device according to the above-described patent document changes the allocated transmission bandwidth after the data amount actually exceeds the threshold. Accordingly, it seems that the overflow is easily generated in the above-described communication device immediately after the real-time communications are started.

In the communication device according to the above-described patent document, only a data amount in real-time communications is monitored, and a data amount in non-real-time communications is not monitored. Accordingly, deterioration in communication quality at real-time communications cannot be prevented in the above-described communication device, wherein the deterioration is caused by a large amount of data in the non-real-time communications and by burst-like increase in a data amount at the non-real-time communications.

In order to reduce the cost of a relay device, it is preferable to use a low-price central processing unit (CPU) for the relay device. Especially, a consumer-use broadband router is strongly required to be a low-price one. Use of a low-price CPU requires reduction in the load on communication processing. When real-time communications and non-real-time communications are carried out using one relay device, the processing load on non-real-time communications is large to cause a possibility that communication quality in real-time communications is deteriorated.

SUMMARY OF THE INVENTION

One object of the present invention is to provide a technique by which, in a relay device, which carries out both real-time communications and non-real-time communications, the communication quality of the device is improved and the cost of the device is reduced.

A communication relay device according to the present invention includes: a first communicator which carries out packet communications with a first real-time communication device and a first non-real-time communication device, which are connected through an external network; a second communicator which accommodates a second real-time communication device included in an internal network; a third communicator which accommodates a second non-real-time communication device included in the internal network; a connection controller which controls connection of the first and the second real-time communication devices for communications; a timing checker which, by monitoring operations of the connection controller, detects a timing before connection of the first and the second real-time communication devices for communications, and a timing after release of the connection for communications; and a resource controller which controls resources for real-time communications and those for non-real-time communications, based on the timings detected by the timing checker.

A communication relay method according to the present invention includes: a step at which packet communications are carried out for a first real-time communication device and a first non-real-time communication device, which are connected through an external network; a step at which communications with a second real-time communication device included in an internal network are carried out; a step at which communications with a second non-real-time communication device included in the internal network are carried out; a step at which connection of the first and the second real-time communication devices for communications is controlled; a step at which, by monitoring operations of the connection controller, there are checked a timing before connection of the first and the second real-time communication devices for communications, and a timing after release of the connection for communications; and a step at which resources for real-time communications and those for non-real-time communications are controlled, based on the timings detected at the timing checking step.

A computer program product according to the present invention includes programs by which a computer executes the steps including: a step at. which packet communications are carried out for a first real-time communication device and a first non-real-time communication device, which are connected through an external network; a step at which communications with a second real-time communication device included in an internal network are carried out; a step at which communications with a second non-real-time communication device included in the internal network are carried out; a step at which connection of the first and the second real-time communication devices for communications is controlled; a step at which, by monitoring operations of the connection controller, there are checked a timing before connection of the first and the second real-time communication devices for communications, and a timing after release of the connection for communications; and a step at which resources for real-time communications and those for non-real-time communications are controlled, based on the timings detected at the timing checking step.

BRIEF DESCRIPTION OF THE DRAWINGS

Other objects and the advantages of the present invention will be explained, referring to the following attached drawings.

DESCRIPTION OF THE PREFERRED EMBODIMENTS

Hereinafter, embodiments according to the present invention will be explained with reference to drawings. In the drawings, the size and shape of each component, and the arrangement of the components are schematically shown in such a way that the present invention may be understood, and, moreover, numeric conditions which will be hereinafter explained are merely exemplary.

First Embodiment

Figure 2A:
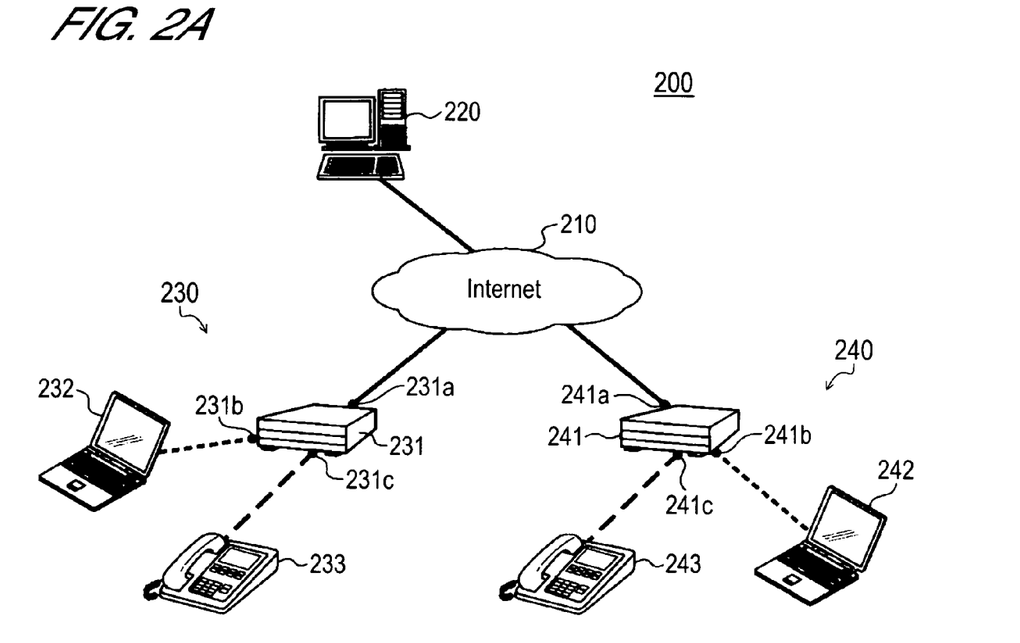
FIG. 2A is a conceptual view showing a structure for a communication network according to a first embodiment.
Figure 2B:
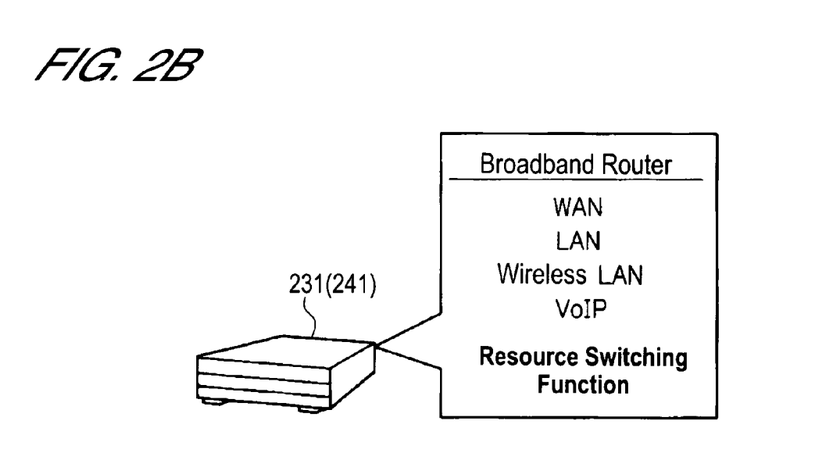
FIG. 2B is a conceptual view explaining functions of a relay device according to the first embodiment.

FIG. 2A is a conceptual view showing a whole configuration of a communication network according to the present embodiment. FIG. 2B is a conceptual view explaining functions of a broadband router according to the present embodiment.

As shown in FIG. 2A, a communication network 200 according to the present embodiment includes the Internet 210, a Web server 220, and LANs 230 and 240. The LAN 230 includes a broadband router 231, a personal computer 232, and a telephone 233. Similarly, the LAN 240 includes a broadband router 241, a personal computer 242, and a telephone 243.

The Web server 220, and the LANs 230 and 240 are connected to one another through the Internet 210. In the present invention, communication networks other than the Internet may be used. The communication network used in the present invention is not required to adopt the Internet Protocol as a network layer of the Open-Systems-Interconnection (OSI) reference model.

The Web server 220 executes a data communication service in the World Wide Web through the Internet 210.

The broadband router 231 is a relay device according to the present invention (refer to FIG. 2B). The broadband router 231 relays communications between the Internet 210 and the LAN 230. More specifically, the broadband router 231 relays data communications between the personal computer 232 and the Web server 220, that is, non-real-time communications, and voice communications between the telephone 233 and the telephone 243, that is, real-time communications. The broadband router 231 is provided with a port 231a for a WAN communication, a port 231b for wireless a LAN communication, and a port 231c which accommodates an analog telephone. The broadband router 231 may be provided with a port for wired communications (refer to FIG. 1). The broadband router 231 is connected to the Internet 210 through the port 231a. A broadband communication technology, for example, an xDSL technology such as an asymmetric digital subscriber line (ADSL) technology may be used for communications between the broadband router 231 and the Internet 210. When the ADSL technology is used, a subscriber line, that is, a copper wire is connected to the port 231a. The broadband router 231 has the after-described function by which wireless LAN bands are automatically switched.

Similarly, the broadband router 241 relays communications between the Internet 210 and the LAN 240. More specifically, the broadband router 241 relays data communications between the personal computer 242 and the Web server 220, and voice communications between the telephone 233 and the telephone 243. The broadband router 241 is provided with a port 241a for WAN communications, a port 241b for wireless LAN communications, and a port 241c which accommodates analog telephones. Furthermore, the broadband router 241 may be provided with a port for wired communications. The broadband router 241 is connected to the Internet 210 through the port 241a. The broadband router 241 has the function by which wireless LAN bands are automatically switched in a similar manner to that of the broadband router 231.

The personal computers 232 and 242 are used as a communication terminal through which a data communication service is obtained. In other words, the personal computers 232 and 242 are communication terminals for non-real-time communications. It has been known that, for example, the VVWW system, the FTP access, and the E-mail system are based on non-real-time communications. The personal computers 232 and 242 are provided with a function for wireless LAN communications, or are connected to a device for wireless LAN communications. The personal computer 232 is connected to the port 231b in the broadband router 231 through a wireless LAN. Similarly, the personal computer 242 is connected to the port 241b in the broadband router 241 through a wireless LAN.

The telephones 233 and 243 are terminals for voice communications. A common analog telephone, that is, a telephone adapted to Public Switched Telephone Networks (PSTN) may be used as the telephones 233 and 243. The analog telephone includes a cordless telephone, a personal handyphone system (PHS) terminal with a function as a cordless telephone, and the like. In addition, a personal computer which is installed with application software for voice communications may be used as the telephones 233 and 243. The telephones 233 and 243 are not required to be provided with a function compatible with the VoIP. The telephone 233 in the present embodiment is connected to the port 231c in the broadband router 231 through, for example, analog copper cables. Similarly, the telephone 243 in the present embodiment is connected to the port 241c in the broadband router 241 through, for example, analog copper cables. The telephones 233 and 243 are used for VoIP communications between the broadband routers 231 and 241. The VoIP communications are real-time communications.

As described above, the personal computers 232 and 242 in the present embodiment are connected to the broadband routers 231 and 241 through a wireless LAN. When the wireless LAN is used, loads on CPUs installed in the broadband router 231 and 241 are larger than those of a case in which LAN cables are used. As described above, the larger loads on the CPUs installed in the broadband routers causes the quality of real-time communications (that is, voice communications using the telephones 233 and 243) to become deteriorated. The broadband router 241 in the present embodiment maintains the quality of real-time communications by automatically switching the transmission bandwidth of the wireless LAN. The details of the switching function of the transmission bandwidths will be described later.

Figure 3:
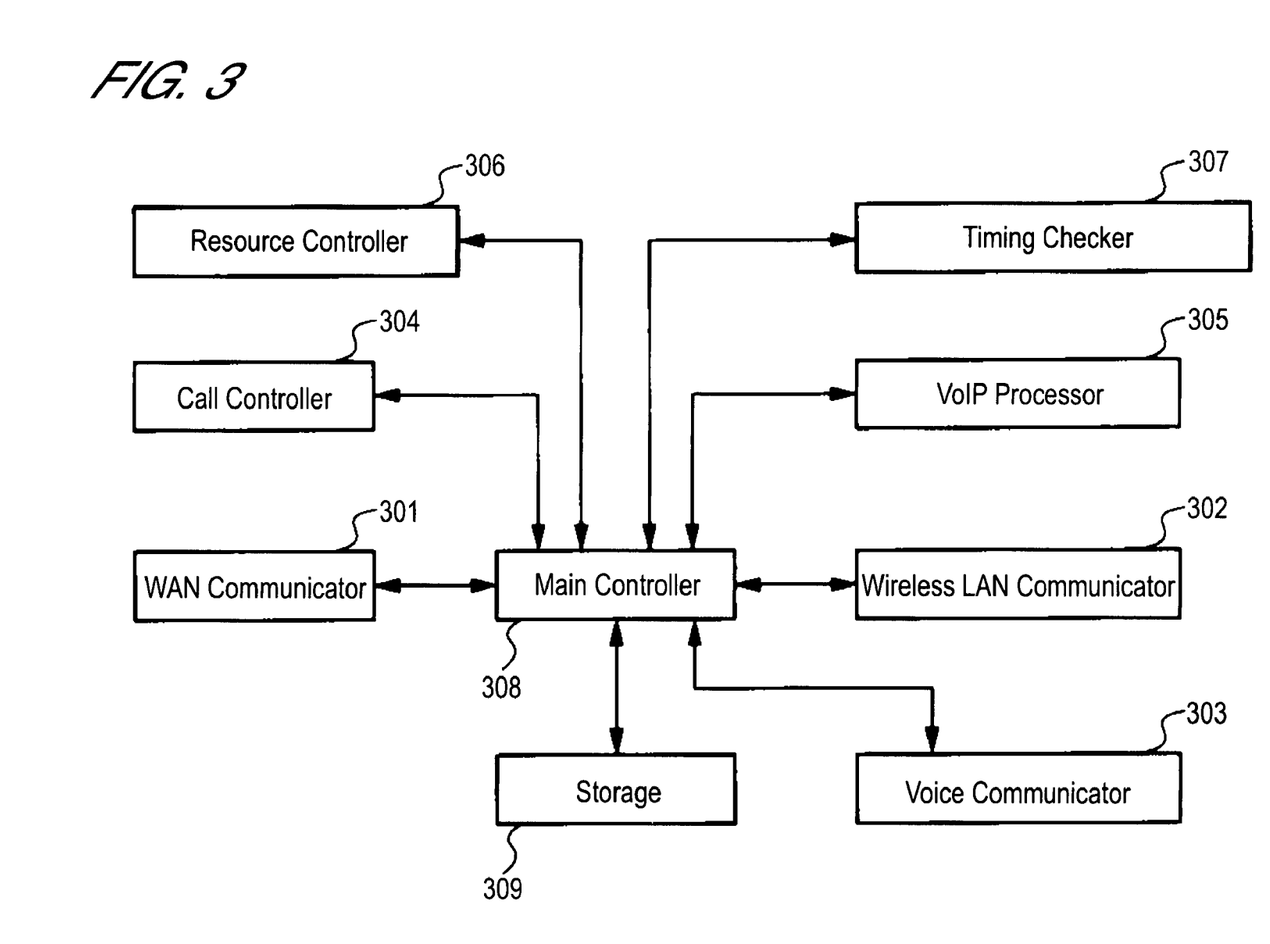
FIG. 3 is a block diagram in which one example of the internal structure of the relay device according to the present invention is schematically shown.

FIG. 3 is a block diagram in which the internal structure of the broadband routers 231 and 241 is schematically shown. As shown in FIG. 3, the broadband routers in the present embodiment are provided with a WAN communicator 301, a Wireless LAN communicator 302, a voice communicator 303, a call controller 304, a VoIP processor 305, a resource controller 306, a timing checker 307, a main controller 308, and a storage 309.

The WAN communicator 301 is connected to the Internet 210 through the port 231a or 241a (refer to FIG. 2A). The WAN communicator 301 carries out communications according to the Internet Protocol and the Voice over Internet Protocol. A global IP address in the Internet 210 is allocated to the WAN communicator 301.

The wireless LAN communicator 302 is connected to the personal computer 232 or 242 through the port 231b or 241b. For example, IEEE 802.11 may be used as a communication protocol. Moreover, for example, a carrier sense multiple access with collision avoidance (CSMA/CA) control method may be used as a protocol for media access control. The maximum transmission bandwidth in the wireless LAN communications is, for example, 54 Mbps.

The voice communicator 303 is connected to the telephone 233 or 243 through the port 231c or 241c. The voice communicator 303 carries out voice communications according to the PSTN. Since the voice communications adapted for the PSTN is used, a telephone adapted for the PSTN may be used as the telephone 233 or 243.

The call controller 304 carries out call control for VoIP communications. For example, the session initiation protocol (SIP), and the ITU-T Recommendation H.323 have been known as a call control protocol for VoIP communications. When the SIP is adopted, call control is carried out between the call controller 304 and a SIP server (not shown). The SIP server is connected to the Internet 210.

The VoIP processor 305 converts a format of voice data. The VoIP processor 305 converts voice data input from the voice communicator 303 to a voice packet according to the VoIP, and the converted data is sent to the WAN communicator 301. In addition, the VoIP processor 305 converts the voice packet input from the WAN communicator 301 to voice data according to the PSTN, and the converted packet is sent to the voice communicator 303.

The resource controller 306 allocates resources to real-time communications and to non-real-time communications. The resources include transmission bandwidths between the Internet 210 and the WAN communicator 301. Furthermore, the resources include the throughput of a CPU (not shown) installed in the broadband router 231 or 241. According to the present embodiment, most of, or all of the resources are allocated to the non-real-time communications when real-time communications are not carried out. On the other hand, when real-time communications are carried out, the resource controller 306 allocates transmission bandwidths enough for securing the communication quality to the real-time communications, and allocates the remaining transmission bandwidths to the non-real-time communications. When transmission bandwidths of real-time communications expands, maximum number of the real-time communication packets which can be transmitted and received via the transmission bandwidths increases. The resource controller 306 allocates the throughput of CPU enough for processing the maximum number packets to the real-time communications, and allocates the remaining throughput to the non-real-time communications. The throughput of CPU enough for processing the maximum number packets of the real-time communications can be measured by making the throughput of non-real-time communications increase gradually under a condition that the CPU carries out processes related to the real-time communications.

The timing checker 307 detects a timing according to which the resource controller 306 changes the allocation of the resources. The allocation of the resources is changed immediately before real-time communications are started, and immediately after the real-time communications are completed. The timing checker 307 detects the above timing by monitoring call-control messages which the call controller 304 transmits and/or receives. A concrete example in which the timing is detected will be described later, referring to FIG. 4.

The main controller 308 activates the above-described components 301 through 307. The main controller 308 includes the CPU installed in the broadband router 231 or 241, and an operating system. A part of, or all of the components 301 through 307 may be formed on the main controller 308 in the form of software.

The storage 309 includes nonvolatile memories and volatile memories. The nonvolatile memories are, for example, read only memories (ROMs), or hard disks. The volatile memories are, for example, random access memories (RAMs). The nonvolatile memories save an operating system and other programs. The volatile memories are temporary saving memories for executing programs, or buffers in which packets for real-time communications are temporarily saved.

Figure 4:
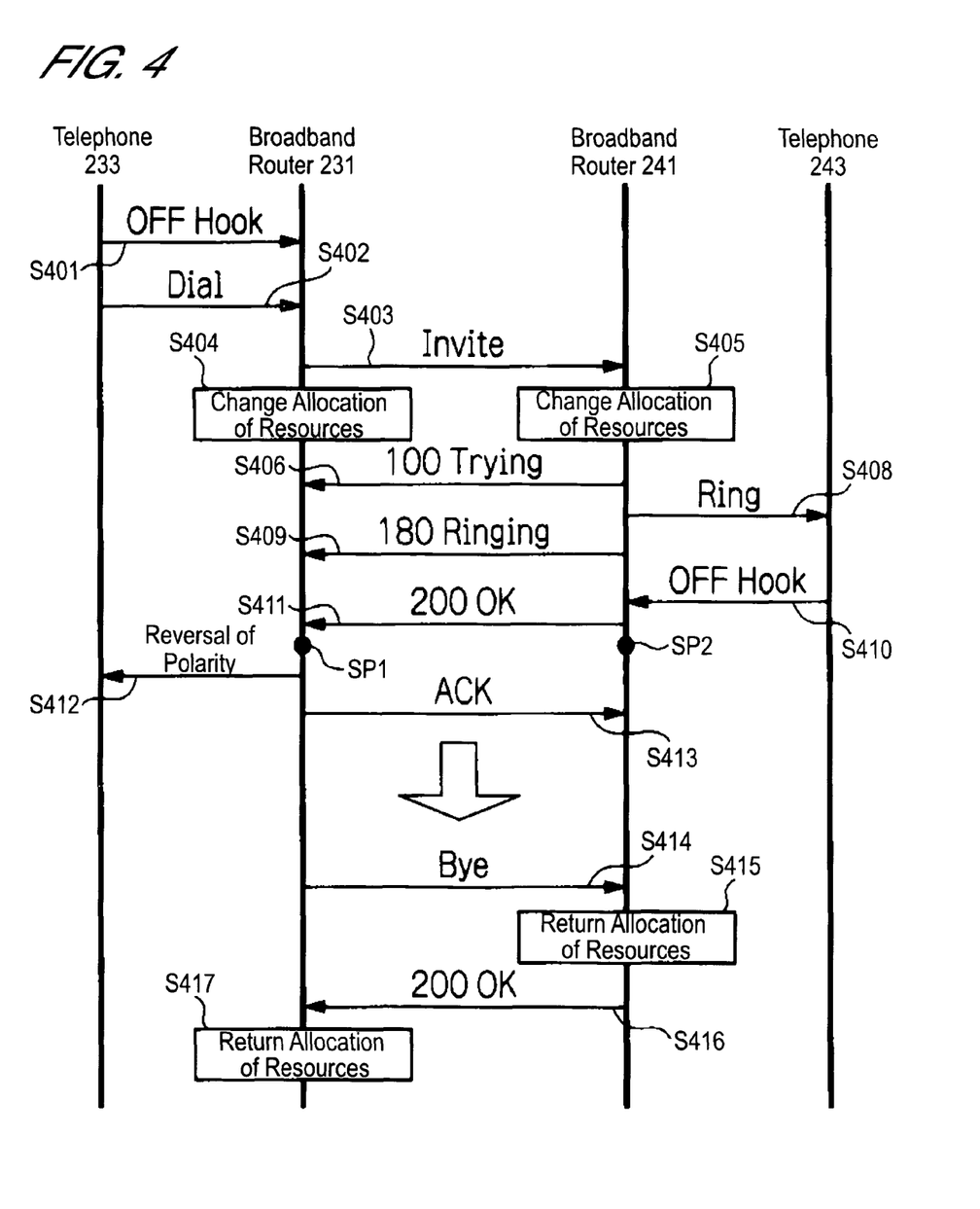
FIG. 4 is a view explaining the operation sequence of a communication network according to the first embodiment.

Whole operations in the communication network 200 will be explained, referring to a sequence diagram shown in FIG. 4. In the following explanation, the telephone 233 carries out call processing, and the telephone 243 carries out called processing.

As described above, all of, or most of the resources are allocated to non-real-time communications when VoIP communications are not carried out. Whether the number of resources allocated to real-time communications is set zero depends on specifications for call control communications. When the call control communications are non-real-time communications, the number of resources allocated to real-time communications may be set zero, but the number of the resource may not be set zero when the call control communications are real-time communications. When a transport layer in the OSI reference model has a retransmit control function, that is, when, for example, the transmission control protocol (TCP) is adopted, the call control communications are non-real-time communications. On the other hand, when the transport layer does not have the retransmit control function, that is, when, for example, the user datagram protocol (UDP) is adopted, the call control communications are real-time communications.

To start a VoIP communication, a call user off-hooks the telephone 233 in the first place (refer to Step S401). Furthermore, the call user operates the telephone 233 to dial the telephone number of a called telephone 243 (refer to Step S402). The dialed telephone number is sent to the call controller 304 (refer to FIG. 3) in the broadband router 231.

When the call controller 304 in the broadband router 231 receives the called-side telephone number, the call controller 304 makes an INVITE message, and sends the message to the WAN communicator 301. The INVITE message is a message requesting call connection defined in the SIP. The WAN communicator 301 stores the INVITE message in an IP packet, and transmits the packet to the Internet 210 (refer to Step S403). The above IP packet reaches the SIP server through a not-shown router and the like. The SIP server extracts the INVITE message from the IP packet, and executes processing such as address resolution. According to the above processing, the SIP server specifies an IP address corresponding to the called side telephone number of the INVITE message, that is, an IP address allocated to the broadband router 241. Thereafter, the SIP server stores the INVITE message in an IP packet which is transmitted to the specified IP address.

As described above, the timing checker 307 (refer to FIG. 3) monitors the call control message which the call controller 304 transmits and receives. When the timing checker 307 detects that the call controller 304 has transmitted the INVITE message, it is notified to the resource controller 306 that VoIP communications will be started. When the resource controller 306 receives the above notification, the allocation of the resources is changed (refer to Step S404). As described above, resources enough for securing communication quality are allocated to real-time communications, and the remaining resources are allocated to non-real-time communications when the VoIP communications are started. For example, the resource controller 306 changes the transmission band allocated to non-real-time communications from the maximum value, that is, 54 Mbps to 6 Mbps. The remaining transmission band is allocated to real-time communications. Similarly, allocation of the driving performance of the CPU is changed according to the transmission band.

Though the present embodiment is an example in which the allocation of the resources is changed after the INVITE message is transmitted, the allocation may be changed before the INVITE message is transmitted. For example, immediately after the INVITE message is generated, the allocation may be changed.

The broadband router 241 receives the INVITE message from the SIP server. The WAN communicator 301 in the broadband router 241 extracts the INVITE message from a received IP packet, and the extracted message is sent to the call controller 304 (refer to FIG. 3). The timing checker 307 detects that the call controller 304 has received the INVITE message, and provides the resource controller 306 with notification that VoIP communications will be started. When the resource controller 306 receives the above notification, the allocation of the resources is changed (refer to Step S405). The resource controller 306 in the broadband router 241 allocates resources enough for securing the communication quality to real-time communications in a similar manner to that of the broadband router 231.

Subsequently, the call controller 304 in the broadband router 241 sends a "100 Trying message" to the WAN communicator 301. The "100 Trying message" is a temporary message by which it is notified that requested processing of call connection is being executed. The "100 Trying message" is stored in an IP packet at the WAN communicator 301, and the packet is transmitted to the broadband router 231 through the Internet 210 (refer to Step S406).

The call controller 304 in the broadband router 241 transmits a ring signal to the telephone 243 (refer to Step S408). When the ring signal is received, the telephone 243 produces a ringing tone. Furthermore, the call controller 304 in the broadband router 241 sends a "180 Ringing message" to the WAN communicator 301. The "180 Ringing message" is a message by which it is notified that the telephone 243 is ringing. The "180 Ringing message" is stored in an IP packet at the WAN communicator 301, and the packet is transmitted to the broadband router 231 through the Internet 210 (refer to Step S409).

When a called user off-hooks the telephone 243, an off-hook signal is transmitted from the telephone 243 to the broadband router 241 (Step S410). When the call controller 304 in the broadband router 241 receives the off-hook signal, a "200 OK message" is sent to the WAN communicator 301. The "200 OK message" is a message by which it is notified that processing corresponding to the INVITE message (that is, the request for call connection) has been completed. The "200 OK message" is stored in an IP packet at the WAN communicator 301, and the packet is transmitted to the broadband router 231 through the Internet 210 (refer to Step S411).

The broadband router 231 reverses the polarity of a direct-current voltage applied to cables which connect the voice communicator 303 and the telephone 233 (Step S412). By the above reversing, the call connection processing of the telephone 233 is completed. Furthermore, the broadband router 231 sends an "ACK message" to the WAN communicator 301. The "ACK message" is a response signal by which it is notified that the "200 OK message" has been received. The ACK message is stored in an IP packet at the WAN communicator 301, and the packet is transmitted to the broadband router 241 through the Internet 210 (refer to Step S413).

According to the above-described processing, call connection is established between the telephones 233 and 243 to enable the telephones to start conversation. As described above, the broadband routers 231 and 241 according to the present embodiment allocate resources enough for securing communication quality to real-time communications, and the remaining resources to non-real-time communications before VoIP communications are started. Accordingly, even when one, or both of, the personal computers 232 and 242 carry out non-real-time communications, overflow is hardly generated in a buffer (not shown) of the broadband router, that is, there is less possibility that a packet is lost in the VoIP communications. As a result, the broadband routers 231 and 241 according to the present embodiment may realize sufficiently high quality of the VoIP communications.

To release the call connection, the telephone 233 or 243 is on-hooked. FIG. 4 shows an example in which the telephone 233 is on-hooked. When the telephone 233 is on-hooked (not shown), the call controller 304 in the broadband router 231 sends a Bye message to the WAN communicator 301. The Bye message is a message by which call release is requested. The Bye message is stored in an IF packet at the WAN communicator 301, and the packet is transmitted to the broadband router 241 through the Internet 210 (refer to Step S414).

The Bye message received at the broadband router 241 is sent to the call controller 304 through the WAN communicator 301. When the timing checker 307 in the broadband router 241 detects that the call controller 304 has received the Bye message, it is notified to the resource controller 306 that VoIP communications have been completed. When the resource controller 306 receives the above notification, allocation of the resources is returned to a state before the call connection is established (refer to Step S415). For example, the resource controller 306 returns the transmission band allocated to non-real-time communications from 6 Mbps to 54 Mbps.

When the call controller 304 in the broadband router 241 receives the Bye message, the router 241 carries out usual call-release processing, and sends the "200 OK message" to the WAN communicator 301. The 200 OK message is a message by which it is notified that the processing corresponding to the Bye message has been completed. The "200 OK message" is stored in an IP packet at the WAN communicator 301, and the packet is transmitted to the broadband router 231 through the Internet 210 (refer to Step S416).

The "200 OK message" received by the broadband router 231 is sent to the call controller 304 through the WAN communicator 301. When the timing checker 307 in the broadband router 231 detects that the "200 OK message" has been received by the call controller 304, it is notified to the resource controller 306 that VoIP communications have been completed. When the resource controller 306 receives the above notification, allocation of the resources is returned to a state before the call connection is established (refer to Step S417). For example, the resource controller 306 returns the transmission band allocated to non-real-time communications from 6 Mbps to 54 Mbps. According to the above processing, the call release processing is completed.

Steps S404 and S405 may be carried out at any time after off-hook processing and before call connection. In addition, Steps S415 and S417 may be carried out at any time after a call is released. A timing at which the above Steps S404, S405, S415, and S417 are executed may be judged based on a transmitting timing or a receiving timing of a message which is generated in the broadband router. In addition, a timing at which the above steps are executed may be judged based on timing at which a signal is transmitted to the telephones 233 and 243, or a timing at which a signal is received from the telephones 233 and 243.

More specifically, Step S416 may be executed before Step S415 is done. In addition, processing at Step S417 may be executed before Step S414 is done. Step S404 may be executed at a timing shown in FIG. 4 with a symbol SP1. Similarly, Step S405 may be executed at a timing shown in FIG. 4 with a symbol SP2. When Steps S403 and S404 are executed at timing, for example, SP1 and SP2 after Step S410, the resources are not changed unless the called user off-hooks the telephone 243. Accordingly, there may be avoided an inconvenience that the resources are changed though call connection is not actually established.

As described above, the broadband routers 231 and 241 according to the present embodiment change the allocation of the resources before VoIP communications are started. Accordingly, when the communication data amount increases, the broadband router 231 and 241 according to the present embodiment may surely secure more sufficient quality for VoIP communications in comparison with the quality of a device in which resources are changed.

The broadband router 231 and 241 according to the present embodiment allocate resources enough for securing communication quality to real-time communications, and the remaining resources to non-real-time communications. Accordingly, the broadband routers 231 and 241 may secure communication quality even when the amount of communication data is rapidly changed.

In addition, reduction in the use efficiency of the resources may be suppressed to the minimum by changing the allocation of the resources after the called-side telephone 243 is off-hooked.

Second Embodiment

Figure 5:
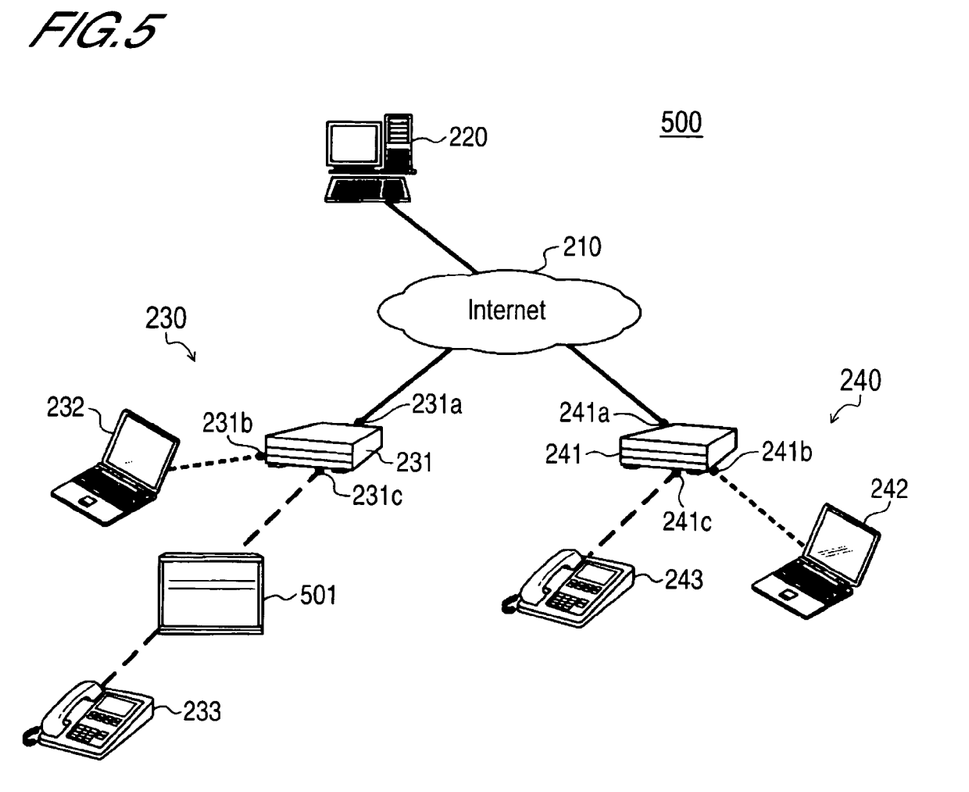
FIG. 5 is a conceptual view showing the structure of a communication network according to a second embodiment.

FIG. 5 is a conceptual view showing a whole configuration of another communication network according to the present embodiment.

In FIG. 5, devices similar to those previously described in FIG. 2 are denoted by the same reference numbers as those in FIG. 2. A communication network 500 in the present embodiment is different from that according to the above-described first embodiment in a point that the network 500 is provided with a private branch exchange (PBX) 501 as shown in FIG. 5.

The PBX 501 is connected to an analog-telephone accommodating port 231c in a broadband router 231. In addition, the PBX 501 may accommodate one or a plurality of telephones. Only one telephone 233 is shown in FIG. 5 for simplification of explanation. Since there is provided the PBX 501 in the communication network, the telephone 233 may be used as an extension telephone. That is, the telephone 233 may call other extension telephones, and makes outside call.

Figure 6:
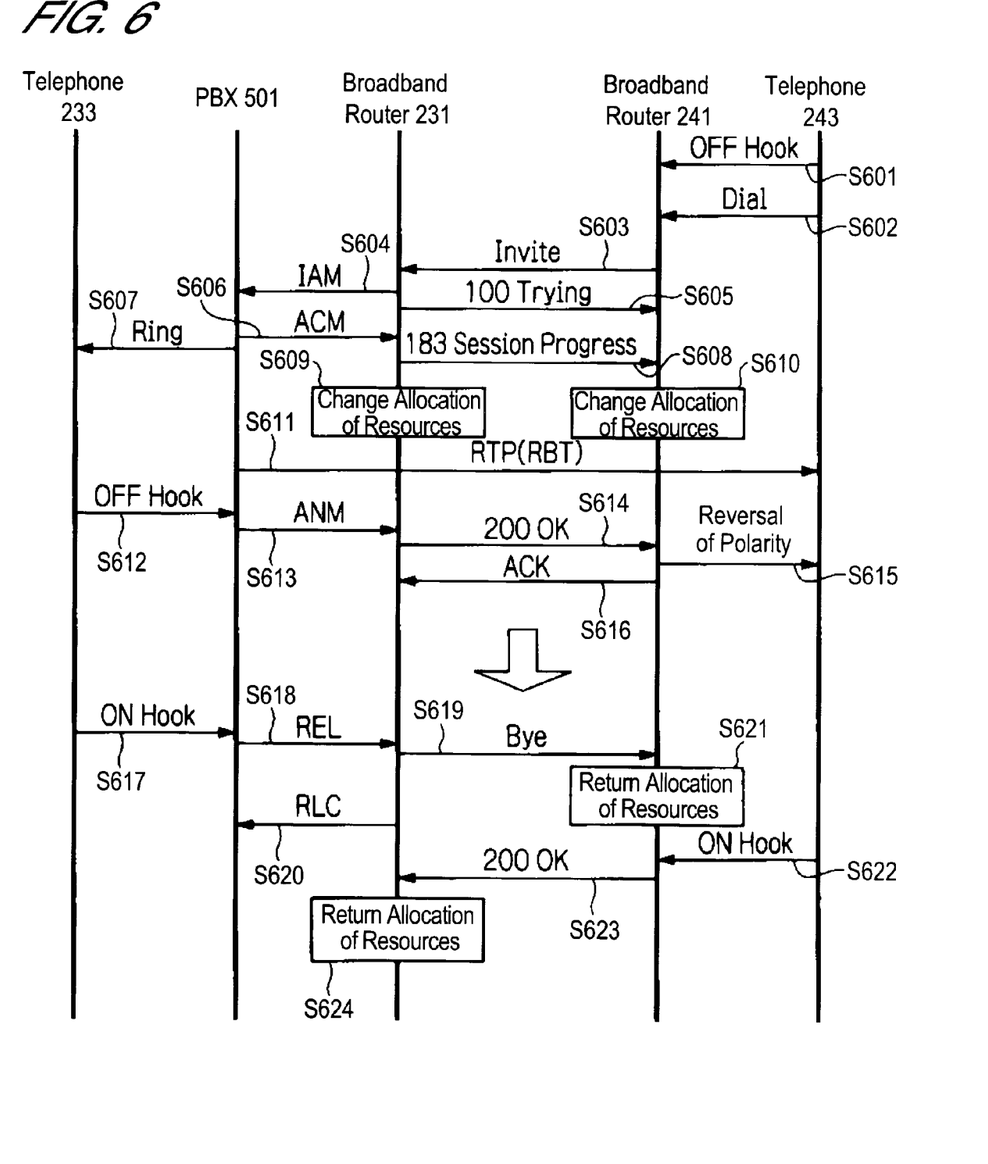
FIG. 6 is a view explaining the operation sequence of the communication network according to the second embodiment.

All operations in the communication network 500 will be explained, referring to a sequence diagram shown in FIG. 6. In the following explanation, a telephone 243 carries out call processing, and the PBX 501 and the telephone 233 carry out called processing.

When VoIP communications are not carried out, all of, or most of the resources are allocated to non-real-time communications in a similar manner to that of the first embodiment. Whether the number of resources allocated to real-time communications is set to zero depends on specifications for call control communications.

To start a VoIP communication, a call user off-hooks the telephone 243 in the first place (refer to Step S601). Furthermore, the call user operates the telephone 243 to dial the telephone number of the called telephone 233 (refer to Step S602). The dialed telephone number is sent to a call controller 304 in the broadband router 241 (refer to FIG. 3).

When the call controller 304 in the broadband router 241 receives the called-side telephone number, an INVITE message is sent to a WAN communicator 301. The INVITE message is stored in an IP packet at the WAN communicator 301, and the packet is transmitted to the Internet 210 (refer to Step S603). The above IP packet is received by a broadband router 231 through a SIP server and a relay device in a similar manner to that of the first embodiment.

The WAN communicator 301 in the broadband router 231 extracts the INVITE message from the received IP packet, and sends the extracted message to the call controller 304. Subsequently, the call controller 304 sends an initial address message (IAM) to the PBX 501 (refer to Step S604). The IAM is an address signal which notifies the called-side telephone number. Furthermore, the call controller 304 in the broadband router 231 sends "100 Trying message" to the WAN communicator 301. The "100 Trying message" is stored in an IP packet at the WAN communicator 301, and the packet is transmitted to the broadband router 241 through the Internet 210 (refer to Step S605).

The PBX 501 transmits an address complete message (ACM) signal to the broadband router 231 when the PBX 501 completes receiving the IAM signal (refer to Step S606). The ACM is a signal notifying that receiving of the IAM signal has been completed. Furthermore, the PBX 501 transmits a ring signal to the telephone 233 (refer to Step S607). When the ring signal is received, the telephone 233 produces a ringing tone.

When the call controller 304 in the broadband router 231 receives the ACM signal, a "183 Session Progress message" is sent to the WAN communicator 301. The "183 Session Progress message" is a message which notifies that the called-side telephone 233 is in a state of being called. The "183 Session Progress message" is stored in an IP packet at the WAN communicator 301, and the packet is transmitted to the broadband router 241 through the Internet 210 (refer to Step S608).

A timing checker 307 in the broadband router 231 detects that the call controller 304 has transmitted the "183 Session Progress message," and notifies a resource controller 306 that VoIP communications will be started. When the resource controller 306 receives the above notification, the allocation of the resources is changed (refer to Step S609). The resource controller 306 in the broadband router 231 allocates resources enough for securing communication quality to real-time communications in a similar manner to that of the first embodiment.

The WAN communicator 301 in the broadband router 241 extracts the "183 Session Progress message" from a received IP packet, and the message is sent to the call controller 304. The timing checker 307 in the broadband router 241 detects that the call controller 304 has received the "183 Session Progress message," and notifies a resource controller 306 that VoIP communications will be started. When the resource controller 306 receives the above notification, the allocation of the resources is changed (refer to Step S610). The resource controller 306 in the broadband router 241 allocates resources enough for securing communication quality to real-time communications.

The PBX 501 outputs a ring back tone (RBT) signal (refer to Step S611). The RBT signal is a tone signal which notifies the call user that the called-side telephone 233 is being called. The RBT signal is sent to the calling-side telephone 243 through the broadband router 231, the Internet 210, and the broadband router 241. Since, according to the present embodiment, the RBT signal is transmitted after the resources are allocated, the sufficiently high quality of a signal tone can be realized.

When the called user off-hooks the telephone 233, an off-hook signal is transmitted from the telephone 233 to the PBX 501 (Step S612). When the PBX 501 receives the off-hook signal, an answer message (ANM) signal is transmitted to the broadband router 231 (refer to Step S613). The ANM signal is a signal which notifies that off-hook processing is executed.

When the call controller 304 in the broadband router 231 receives the ANM signal, a "200 OK message" is transmitted to the WAN communicator 301. The "200 OK message" is stored in an IP packet at the WAN communicator 301, and the packet is transmitted to the broadband router 241 through the Internet 210 (refer to Step S614).

A broadband router 241 reverses the polarity of a direct-current voltage applied to cables which connect a voice communicator 303 and the telephone 243 (Step S615). By the above reversing, the call connection processing of the telephone 243 is completed. Furthermore, the broadband router 241 sends an ACK message to the WAN communicator 301. The ACK message is stored in an IP packet in the WAN communicator 301, and the packet is transmitted to the broadband router 231 through the Internet 210 (refer to Step S616).

According to the above-described processing, call connection is established between the telephones 233 and 243 to enable the telephones to start conversation. In a similar manner to that of the first embodiment, the broadband routers 231 and 241 according to the present embodiment allocate resources enough for securing communication quality to real-time communications, and the remaining resources to non-real-time communications before VoIP communications are started. Accordingly, even when one, or both of the personal computers 232 and 242 carry out non-real-time communications, overflow is hardly generated in the broadband routers and in a buffer of other relay devices. Accordingly, the sufficiently high quality of VoIP communications is realized.

To disconnect the call connection, the telephone 233 or 243 is on-hooked. FIG. 6 shows an example in which the telephone 233 is on-hooked. The telephone 233 sends an on-hook signal to the PBX 501 (refer to Step S617). The PBX 501 sends a release message (REL) signal to the call controller 304 in the broadband router 231 (refer to Step S618). The REL signal is a signal requesting call release. When the call controller 304 in the broadband router 231 receives the REL signal, a Bye message is sent to the WAN communicator 301. The Bye message is stored in an IP packet at the WAN communicator 301, and the packet is transmitted to the broadband router 241 through the Internet 210 (refer to Step S619). In addition, the broadband router 231 transmits a release complete message (RLC) signal to the PBX 501 (refer to Step S620). The RLC signal is a signal notifying that the call release has been completed.

The Bye message received by the broadband router 241 is sent to the call controller 304 through the WAN communicator 301. When the timing checker 307 in the broadband router 241 detects that the call controller 304 has received the Bye message, it is notified to the resource controller 306 that the VoIP communications have been completed. When the resource controller 306 receives the above notification, allocation of the resources is returned to a state before the call connection is established (refer to Step S621). For example, the resource controller 306 returns the transmission band allocated to non-real-time communications from 6 Mbps to 54 Mbps.

Thereafter, when the call user on-hooks the telephone 243, an on-hook signal is sent to the broadband router 241 (refer to Step S622). However, the call is released even when the call user does not on-hook.

When the call controller 304 in the broadband router 241 receives the Bye message, usual call-release processing is carried out, and, moreover, the "200 OK message" is sent to the WAN communicator 301. The "200 OK message" is stored in an IF packet at the WAN communicator 301, and the packet is transmitted to the broadband router 231 through the Internet 210 (refer to Step S623).

The "200 OK message" received at the broadband router 231 is sent to the call controller 304 through the WAN communicator 301. When the timing checker 307 in the broadband router 231 detects that the call controller 304 has received the "200 OK message," it is notified to the resource controller 306 that VoIP communications have been completed. When the resource controller 306 receives the above notification, allocation of the resources is returned to a state before the call connection is established (refer to Step S624). For example, the resource controller 306 returns the transmission band allocated to non-real-time communications from 6 Mbps to 54 Mbps. Thereby, call release processing is completed.

As described above, the broadband routers 231 and 241 according to the present embodiment change the allocation of the resources before the RBT signal is transmitted. Accordingly, the broadband routers 231 and 241 in the present embodiment can secure voice signals and the RBT signal of sufficient quality.

The broadband routers 231 and 241 according to the present embodiment allocate resources enough for securing communication quality to real-time communications, and the remaining resources to non-real-time communications. Accordingly, the broadband routers 231 and 241 may secure the communication quality even when the communication data amount is rapidly changed.

In the first and second embodiments, the broadband routers 231 and 241 and the personal computers 232 and 242 are not necessarily connected through the wireless LAN.

In the first and second embodiments, connection between the broadband routers 231, 241 and the telephones 233, 243 may be realized through the wireless LAN.

The present invention may be applied to real-time communications other than the VoIP communications, for example, to a video telephone system, a facsimile system, and a television conference system, and the like.

Though the examples in which the present invention is applied to both of the broadband routers 231 and 241 have been explained in the first and second embodiments, communication connection between a broadband router, to which the present invention is applied, and a broadband router, to which the present invention is not applied may be realized.

The present invention may be applied to a network using a protocol other than the IP protocol, for example, to a network using the Internet work Packet Exchange (IPX) protocol.

The present invention may be structured as software, and, also, as hardware. When the present invention is structured as software, the number of CPUs is not necessarily one.

What is claimed is:

1. A communication relay device, comprising:
A first communicator which carries out packet communications with a first real-time communication device and a first non-real-time communication device, which are connected through an external network;
a second communicator which accommodates a second real-time communication device included in an internal network;
a third communicator which accommodates a second non-real-time communication device included in the internal network;
a connection controller which controls communication connection of the first and second real-time communication devices;
a timing checker which detects a timing before communication connection and a timing after communication disconnection of the first and second real-time communication devices, by monitoring operations of the connection controller;
a resource controller which allocates the most of or all of the resources to the non-real-time communications when real-time communications are not carried out, and allocates transmission bandwidths enough for securing the communication quality to the real-time communications and allocates the remaining transmission bandwidths to the non-real-time communications when real-time communications are carried out, based on the timings detected by the timing checker; and
a main hardware controller which includes the CPU and an operating system, wherein said first communicator, said second communicator, said third communicator, said connection controller, said timing checker, said resource controller are formed on said main hardware controller in the form of software.

2. The communication relay device according to claim 1, wherein
the communications between the first and second real-time communication devices are voice communications.

3. The communication relay device according to claim 2, wherein
the connection controller is a call controller by which call connection and call disconnection for the first and second real-time communication devices are controlled.

4. The communication relay device according to claim 3, wherein
the timing checker detects the timings using information which are transmitted or received by the call controller.

5. The communication relay device according to claim 3, wherein
voice communications between the first real-time communication device and the first communicator are Voice over Internet Protocol communications.

6. The communication relay device according to claim 5, wherein
the timing checker detects a timing at which the call controller transmits or receives a predetermined message for the first real-time communication device.

7. The communication relay device according to claim 3, wherein voice communications between the second communicator and the second real-time communication device are communications adapted to Public Switched Telephone Networks.

8. The communication relay device according to claim 7, wherein
the timing checker detects a timing at which the call controller transmits or receives a predetermined signal for the second real-time communication device.

9. The communication relay device according to claim 1, wherein
the resource controller controls a ratio between a transmission bandwidth allocated to real-time communications and that allocated to non-real-time communications.

10. The communication relay device according to claim 1, wherein
the resource controller controls a ratio between a throughput, at which a processor executes real-time communications, and that at which the processor executes non-real-time communications.

11. The communication relay device according to claim 1, wherein
non-real-time communications are carried out through the wireless LAN.

12. A method for relaying communications, comprising steps of:
relaying a communication with a first non-real-time communication device connected to an external network and a second non-real-time communication device connected to an internal network;
carrying out a control for communication connecting and disconnecting between a first real-time communication device connected to the external network and a second real-time communication device contained to the internal network;
relaying the communication with the first and the second real-time communication device;
checking a timing before the connection of the first and the second real-time communication devices is established, and a timing after the connection is released; and
controlling resources for real-time communications and those for non-real-time communications, based on the timings detected at the timing checking step,
wherein at the step of controlling resources, the most of or all of the resources are allocated to the non-real-time communications when real-time communications are not carried out, and transmission bandwidths enough for securing the communication quality are allocated to the real-time communications and the remaining transmission bandwidths are allocated to the non-real-time communications when real-time communications are carried out.

13. The communication relay method according to claim 12, wherein
communications between the first and second real-time communication devices are voice communications.

14. The communication relay method according to claim 13, wherein
the connection controlling step is a step for controlling establishment and release of a call connection between the first and the second real-time communication devices.

15. The communication relay method according to claim 14, wherein
the timing checking step is to detect the timings using information which are transmitted or received at the call controlling step.

16. The communication relay method according to claim 14, wherein
voice communications for the first real-time communication device are Voice over Internet Protocol communications.

17. The communication relay method according to claim 16, wherein
the timing checking step is to detect a timing at which a predetermined message for the first real-time communication device is transmitted or received at the call controlling step.

18. The communication relay method according to claim 14, wherein voice communications for the second real-time communication device is communications adapted to Public Switched Telephone Networks.

19. The communication relay method according to claim 18, wherein
the timing checking step is to detect a timing at which the call controller transmits or receives a predetermined signal for the second real-time communication device.

20. The communication relay method according to claim 12, wherein
the resource controlling step is to control a ratio between a transmission bandwidth allocated to real-time communications and that allocated to non-real-time communications.

21. The communication relay method according to claim 12, wherein
the resource controlling step is to control a ratio between a throughput, at which a processor executes real-time communications, and that at which the processor executes non-real-time communications.

22. The communication relay method according to claim 12, wherein
non-real-time communications are carried out through the wireless LAN.

23. A computer program product, saved on a non-transitory storage medium connected to a computer, wherein said computer program product includes programs by which the computer executes the steps of:
relaying a communication with a first non-real-time communication device connected to an external network and a second non-real-time communication device connected to an internal network;
carrying out a control for communication connecting and disconnecting between a first real-time communication device connected to the external network and a second real-time communication device contained to the internal network;
relaying the communication with the first and the second real-time communication device;
checking a timing before the connection of the first and the second real-time communication devices is established, and a timing after the connection is released; and
controlling resources for real-time communications and those for non-real-time communications, based on the timings detected at the timing checking step, wherein at the step of controlling resources, the most of or all of the resources are allocated to the non-real-time communications when real-time communications are not carried out, and transmission bandwidths enough for securing the communication quality are allocated to the real-time communications and the remaining transmission bandwidths are allocated to the non-real-time communications when real-time communications are carried out.

24. The computer program product including programs according to claim 23, wherein
communications between the first and second real-time communication devices are voice communications.

25. The computer program product including programs according to claim 24, wherein
the connection controlling step is a step for controlling establishment and release of a call connection between the first and the second real-time communication devices.

26. The computer program product including programs according to claim 25, wherein
the timing checking step is to detect the timings using information which are transmitted or received at the call controlling step.

27. The computer program product including programs according to claim 25, wherein
voice communications for the first real-time communication device are Voice over Internet Protocol communications.

28. The computer program product including programs according to claim 27, wherein the timing checking step is to detect a timing at which a predetermined message for the first real-time communication device is transmitted or received at the call controlling step.

29. The computer program product including programs according to claim 25, wherein voice communications for the second real-time communication device is communications adapted to Public Switched Telephone Networks.

30. The computer program product including programs according to claim 29, wherein the timing checking step is to detect a timing at which the call controller transmits or receives a predetermined signal for the second real-time communication device.

31. The computer program product including programs according to claim 23, wherein the resource controlling step is to control a ratio between a transmission bandwidth allocated to real-time communications and that allocated to non-real-time communications.

32. The computer program product including programs according to claim 23, wherein the resource controlling step is to control a ratio between a throughput, at which a processor executes real-time communications, and that at which the processor executes non-real-time communications.

33. The computer program product including programs according to claim 23, wherein non-real-time communications are carried out through the wireless LAN.

* * * * *